United States Patent
Tod et al.

(10) Patent No.: US 9,060,317 B2
(45) Date of Patent: **\*Jun. 16, 2015**

(54) METHOD AND DEVICE FOR OBTAINING CANDIDATE INFORMATION

(71) Applicant: BLACKBERRY LIMITED, Waterloo (CA)

(72) Inventors: Anthony William Tod, St. Agatha (CA); Margarita Datsen, Vaughan (CA); Qing He, Kitchener (CA); Johanna Lisa Dwyer, Brookline, MA (US); Jeffrey William Wirtanen, Ottawa (CA)

(73) Assignee: BLACKBERRY LIMITED, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/088,766

(22) Filed: Nov. 25, 2013

(65) Prior Publication Data
US 2014/0080487 A1 Mar. 20, 2014

Related U.S. Application Data

(63) Continuation of application No. 13/542,180, filed on Jul. 5, 2012, now Pat. No. 8,600,381, which is a continuation of application No. 12/356,710, filed on Jan. 21, 2009, now Pat. No. 8,249,591.

(51) Int. Cl.
*H04W 36/00* (2009.01)
*H04W 36/24* (2009.01)
*H04W 36/14* (2009.01)

(52) U.S. Cl.
CPC .......... *H04W 36/24* (2013.01); *H04W 36/0061* (2013.01); *H04W 36/0066* (2013.01); *H04W 36/14* (2013.01)

(58) Field of Classification Search
CPC . H04W 36/30; H04W 36/24; H04W 36/0061; H04W 36/0083; H04W 36/14; H04W 36/0066; H04W 36/26; H04W 36/36; H04W 36/06; H04W 36/0094; H04J 11/0093
USPC .......................... 455/436–444; 370/331–333
See application file for complete search history.

(56) References Cited

U.S. PATENT DOCUMENTS

| | | | |
|---|---|---|---|
| 5,163,161 A | 11/1992 | Bowles et al. | |
| 5,551,071 A | 8/1996 | Nakano et al. | |

(Continued)

FOREIGN PATENT DOCUMENTS

| | | |
|---|---|---|
| CN | 1989713 A | 6/2007 |
| EP | 1739990 | 1/2007 |

(Continued)

OTHER PUBLICATIONS

Office Action dated Mar. 22, 2012 from related U.S. Appl. No. 12/362,616.

(Continued)

*Primary Examiner* — Allahyar Kasraian
(74) *Attorney, Agent, or Firm* — Todd A. Keeler; Borden Ladner Gervais LLP

(57) ABSTRACT

A method, computer readable medium and mobile device for operating using more than one Radio Access Technology (RAT) are provided. When the mobile device is operating in a serving cell of a first RAT, it obtains, through at least one of wireless access radios in the mobile device, a first set of candidate information from a message transmitted for the serving cell. It also obtains, through at least one of the wireless access radios, a second set of candidate information from a message transmitted for a neighbor cell of the serving cell. The mobile device considers the candidate information from the first set and the candidate information from the second set for reselection by the mobile device.

17 Claims, 7 Drawing Sheets

(56) References Cited

U.S. PATENT DOCUMENTS

| | | | |
|---|---|---|---|
| 5,754,956 | A | 5/1998 | Abreu et al. |
| 5,822,686 | A | 10/1998 | Lundberg et al. |
| 5,937,351 | A | 8/1999 | Seekins et al. |
| 6,148,203 | A | 11/2000 | Renko et al. |
| 6,226,527 | B1 | 5/2001 | Dalsgaard et al. |
| 6,430,414 | B1* | 8/2002 | Sorokine et al. ............. 455/442 |
| 6,765,891 | B2 | 7/2004 | Laitinen et al. |
| 6,778,827 | B1 | 8/2004 | Anderson et al. |
| 6,810,251 | B2 | 10/2004 | Hassan et al. |
| 6,889,049 | B2 | 5/2005 | Khawand |
| 7,299,042 | B2 | 11/2007 | Moore et al. |
| 8,023,896 | B2 | 9/2011 | Hildebrand et al. |
| 2001/0005359 | A1 | 6/2001 | Bergqvist |
| 2002/0105927 | A1 | 8/2002 | Holma et al. |
| 2004/0082328 | A1 | 4/2004 | Japenga et al. |
| 2004/0121773 | A1* | 6/2004 | O'Brien ........................ 455/438 |
| 2004/0125783 | A1 | 7/2004 | Hsueh et al. |
| 2004/0157608 | A1 | 8/2004 | Kurose et al. |
| 2004/0248572 | A1 | 12/2004 | Ormson |
| 2005/0202828 | A1 | 9/2005 | Pecen et al. |
| 2005/0266845 | A1 | 12/2005 | Aerrabotu et al. |
| 2005/0282544 | A1 | 12/2005 | Oommen et al. |
| 2006/0009216 | A1 | 1/2006 | Welnick et al. |
| 2006/0084443 | A1 | 4/2006 | Yeo et al. |
| 2006/0154699 | A1 | 7/2006 | Ko et al. |
| 2007/0004408 | A1 | 1/2007 | Buckley et al. |
| 2007/0207815 | A1 | 9/2007 | Alfano et al. |
| 2007/0230420 | A1 | 10/2007 | Bumiller et al. |
| 2007/0270148 | A1* | 11/2007 | Yeh et al. ...................... 455/436 |
| 2008/0014957 | A1 | 1/2008 | Ore |
| 2008/0153486 | A1 | 6/2008 | Ramkull et al. |
| 2008/0176564 | A1 | 7/2008 | Eerolainen |
| 2009/0003279 | A1* | 1/2009 | Abusch-Magder et al. .. 370/331 |
| 2009/0047958 | A1 | 2/2009 | Rimhagen et al. |
| 2010/0222055 | A1 | 9/2010 | Cho et al. |

FOREIGN PATENT DOCUMENTS

| | | |
|---|---|---|
| EP | 1744573 | 1/2007 |
| EP | 1788832 | 5/2007 |
| EP | 1830596 | 9/2007 |
| EP | 1858278 | 11/2007 |
| EP | 1921882 | 5/2008 |
| EP | 1921885 | 5/2008 |
| WO | 92/19982 | 11/1992 |
| WO | 00/16581 | 3/2000 |
| WO | 01/33481 | 5/2001 |
| WO | 01/62034 | 8/2001 |
| WO | 01/76274 | 10/2001 |
| WO | 02/21875 | 3/2002 |
| WO | 2004/010719 | 1/2004 |
| WO | 2005/011134 | 2/2005 |
| WO | 2005/120123 | 12/2005 |
| WO | 2006/014092 | 2/2006 |
| WO | 2007/076232 | 7/2007 |
| WO | 2008154218 | 12/2008 |

OTHER PUBLICATIONS

Examination Report dated Jun. 8, 2010 from related European Patent Application No. 09151727.6.

Ericsson, "On Inter-RAT Cell Reselection Principles", http://www.3gpp.org/ftp/tsg_ran/WG2_RL2/TSGR2_57/Documents/,retrived on Apr. 23, 2008.

European Search Report dated Jun. 29, 2009 from corresponding European Patent Application No. 09151050.3.

European Search Report dated Jul. 23, 2009 from related European Patent Application No. 09151727.6.

European Search Report dated Jan. 5, 2009 from European Patent Application No. EP08160765.

3GPP; "3rd Generation Partnership Project; Technical Specification Group GSM/EDGE Radio Access Network; Radio subsystem link control (Release 8)"; GSM Global System for Mobile Communications; 3GPP TS 45.008 V8.0.0 (Aug. 2008).

3GPP; "3rd Generation Partnership Project; Technical Specification Group Radio Access Network; Requirements for support of radio resource management (FDD) (Release 5)"; 3GPP TS 25.133 V5.18.0 (Sep. 2007).

3GPP; "3rd Generation Partnership Project; Technical Specification Group GSM/EDGE Radio Access Network; Mobile radio interface layer 3 specification; Radio Resource Control (RRC) protocol (Release 5)"; GSM Global System for Mobile Communications; 3GPP TS 44.018 V5.22.0 (May 2006).

Office Action dated Dec. 1, 2011 from corresponding U.S. Appl. No. 12/356,710.

Office Action dated Jul. 29, 2011 from corresponding U.S. Appl. No. 12/356,710.

English-language translation of an Office Action dated Jul. 4, 2012 from corresponding Chinese Patent Application No. 20101035567.1.

* cited by examiner

METHOD AND DEVICE FOR OBTAINING CANDIDATE INFORMATION

RELATED APPLICATION

This application is a continuation of previously filed U.S. application Ser. No. 13/542,180 filed Jul. 5, 2012, which in turn is a continuation of previously filed U.S. application Ser. No. 12/356,710 filed Jan. 21, 2009, all hereby incorporated by reference in their entirety.

TECHNICAL FIELD

The present application relates to a mobile device configured to operate using more than one Radio Access Technology (RAT) offered by a carrier and a method for obtaining candidate information while the mobile device is operating in a serving cell of a first RAT.

BACKGROUND

Some mobile devices are configured to operate using more than one Radio Access Technology (RAT). These are known as multi-mode devices. Carriers or service providers that provide services in both 2G (such as GSM [Global System for Mobile Communication] EDGE [Enhanced Data Rates for GSM Evolution]) and 3G (such as UMTS [Universal Mobile Telecommunications System]) and possibly other advanced networks such as EPS (Evolved UTRAN (Universal Terrestrial Radio Access Network) and the Evolved Packet Core) may prefer for subscribers to access 3G networks or other advanced networks whenever feasible.

While a multi-mode mobile device in idle mode is in a 2G cell, a network may provide information on cells or frequencies with other radio access technologies (excluding E-UTRA) in the 3G Cell Reselection list (see 3GPP TS 44.018 Section 3.4.1.2.1.7). For a multi-mode mobile device that supports E-UTRA, E-UTRAN frequencies may be included in the E-UTRAN Cell Reselection list (see 3GPP TS 44.018 Section 3.4.1.2.1.7a). The 3G Cell Reselection list and the E-UTRAN Cell Reselection list are provided in a System Information Type 2quater (SI2Q) message.

If the network provides information on UTRAN cells and possibly E-UTRAN frequencies associated with zero or more not allowed physical layer cell identities (which may be referred to as blacklisted cells) for cell reselection, measurement and reporting, this information is sent in the SI2Q message (see 3GPP TS 44.018 section 3.2.2.1). SI2Q messages are transmitted on a periodic basis and a mobile device with UTRAN or E-UTRAN capability (i.e. a multi-mode device) is configured to listen to the SI2Q messages to obtain a list of 3G cells and possibly E-UTRAN frequencies associated with zero or more not allowed physical layer cell identities which it should measure (or not use in the case of not allowed cell identities). The mobile device measures the neighbour 3G cells or the E-UTRAN frequencies provided and if at least one of those measured cells or frequencies passes threshold measurements as described in 3GPP TS 45.008 section 6.4, the mobile device reselects the 3G or E-UTRAN cell that rates the highest based on the measurements. If priority information is to be used for cell reselection (see 3GPP TS 44.018 section 3.4.1.2.1.12), which is signalled by the presence of the 3G Measurement Control Parameters Description IE or by the presence of the E-UTRAN Measurement Parameters Description IE in the SI2quater message, then the Serving Cell Priority Parameters Description IE is also present in the SI2quater message in order to provide the serving cell priority and reselection parameters. If the MS receives any absolution priorities in dedicated messages (for instance when a call or data session is released) then these dedicated priorities override the priorities received in the SI2quater broadcast message.

If the network sends a list of cells associated with frequencies that are not allowed for reselection (e.g. a blacklist) then this information is also taken into consideration in the cell reselection procedure.

The list of neighbour cells or frequencies provided in the SI2Q message is not always accurate. Sometimes the backend data used to determine the neighbours is incorrect. As well, environmental conditions can cause errors in determining viable 3G cells or E-UTRAN cells. In such situations, timely reselection of the 3G network or the E-UTRAN network is inhibited. This is very visible to the user, as many multi-mode mobile devices will display on a user interface an indication of which RAT is being used.

In addition the list of neighbour cells or neighbour frequencies provided by the 3G network or E-UTRAN network, such as the neighbour cells provided in System Information Block Type 11, 11bis or 12 (see 3GPP TS 25.331 section 10.2.48.8.14, 10.2.48.8.14a, 10.2.48.8.15) may be inaccurate.

BRIEF DESCRIPTION OF THE DRAWINGS

Examples of embodiments will now be described in greater detail with reference to the accompanying drawings, in which.

DETAILED DESCRIPTION OF EMBODIMENTS

Figure 1A:
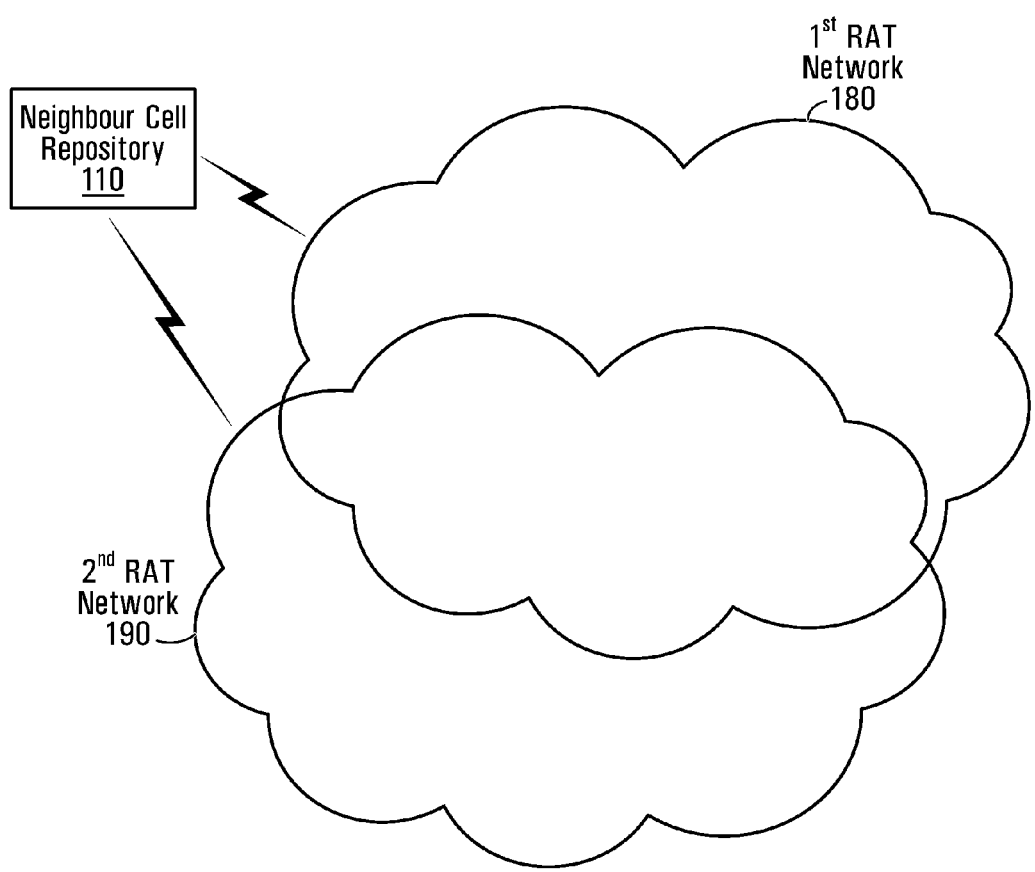
FIGS. 1A, 1B and 1C are diagrams of a system having at least two RATs.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The ability of a mobile device that is configured to operate in 2G, 3G, and possibly other advanced networks such as EPS to quickly reselect back to a 3G or other advanced network after a valid 2G reselection has occurred may be inconsistent in some systems today because of the existence of transient environmental conditions or inconsistent or incomplete network information regarding 3G neighbour cells or E-UTRAN neighbour frequencies. In some situations, the System Information 2 Quater (SI2Q) for a 2G serving cell does not provide all of the viable 3G cells or E-UTRAN frequencies that may be available to the mobile device in the serving cell. In more general terms, a mobile device configured to operate using more than one RAT is provided with information from a neighbour cell repository to be used for reselection to a cell of a second RAT while in a serving cell of a first RAT. Sometimes, the information provided is inaccurate and all viable cells or frequencies on which to search for cells of the second RAT are not provided to the wireless device.

Similarly a mobile device configured to operate in 2G, 3G and possibly other advanced networks such as EPS, remains in the current RAT rather than a reselecting to another RAT where poor or inconsistent network information about neighbour cells or transient environmental conditions exist. In some situations, the System Information Block Type 11, 11bis or 12 of the serving cell in the 3G network does not provide all the viable 3G cells or E-UTRAN frequencies that may be available to the mobile device in the serving cell. In more general terms, a mobile device configured to operate using more than one RAT is provided with information about neighbours cells in another RAT. Sometimes, the information provided in the current RAT is inaccurate and all the viable cells or frequencies on which to search for cells are not provided to the wireless device.

According to one aspect of the present invention, there is provided a mobile device configured to operate using more than one Radio Access Technology 'RAT', the mobile device comprising: for each radio access technology, a respective wireless access radio; a cell selector configured to, while the mobile device is operating in a serving cell of a first RAT: obtain, through at least one of the wireless access radios, a first set of candidate information from a first message comprising candidate information provided for the serving cell, the first set of candidate information concerning cells or frequencies that are provided as candidates for cell reselection from the serving cell; obtain, through at least one of the wireless access radios, a second set of candidate information from a second message comprising candidate information provided for a neighbour cell of the serving cell, the second set of candidate information concerning cells or frequencies that are provided as candidates for cell reselection from the neighbour cell of the serving cell; and consider the candidate information from the first set and the candidate information from the second set in determining a cell for reselection by the mobile device.

According to another aspect of the present invention, there is provided a method for obtaining candidate information while a mobile device is operating in a serving cell of a first Radio Access Technology 'RAT', the method comprising steps of: obtaining a first set of candidate information from a first message comprising candidate information provided for the serving cell, the first set of candidate information concerning cells or frequencies that are provided as candidates for cell reselection from the serving cell; obtaining a second set of candidate information from a second message comprising candidate information provided for a neighbour cell of the serving cell, the second set of candidate information concerning cells or frequencies that are provided as candidates for cell reselection from the neighbour cell of the serving cell; and considering the candidate information from the first set and the candidate information from the second set for reselection by the mobile device.

According to still another aspect of the present invention, there is provided a non-transitory computer readable medium having computer executable instructions stored thereon that when executed by a processor of a mobile device operating in a serving cell of a first Radio Access Technology 'RAT' implement a method for obtaining candidate information, the method comprising: obtaining a first set of candidate information from a first message comprising candidate information provided for the serving cell, the first set of candidate information concerning cells or frequencies that are provided as candidates for cell reselection from the serving cell; obtaining a second set of candidate information from a second message comprising candidate information provided for a neighbour cell of the serving cell, the second set of candidate information concerning cells or frequencies that are provided as candidates for cell reselection from the neighbour cell of the serving cell; and considering the candidate information from the first set and the candidate information from the second set for reselection by the mobile device.

Thus, in another aspect there is provided a mobile device configured to operate using more than one Radio Access Technology (RAT), the mobile device comprising: for each radio access technology, a respective wireless access radio; a cell selection/reselection module configured to, when the mobile device is operating in a serving cell of a first RAT: obtain, through at least one of the wireless access radios, at least one of a first set of candidate cells, or frequencies that may be associated with a first set of not allowed cells of a second RAT from a message transmitted for the serving cell; obtain, through at least one of the wireless access radios, at least one of a second set of candidate cells, or frequencies that may be associated with a second set of not allowed cells of the second RAT from a message transmitted for a neighbour cell of the serving cell; and consider at least one of the candidate cells or frequencies and associated not allowed cells from the first set and the candidate cells or frequencies and associated not allowed cells from the second set for reselection by the mobile device.

In another aspect, there is provided a method for obtaining at least one of candidate cells or frequencies and not allowed cells of the second Radio Access Technology (RAT) while a mobile device is operating in a serving cell of a first RAT, the method comprising: obtaining at least one of a first set of candidate cells or frequencies and associated not allowed cells of the second RAT from a message for the serving cell; obtaining at least one of a second set of candidate cells or frequencies and associated not allowed cells or frequencies of the second RAT from a message transmitted for a neighbour cell of a serving cell; and considering at least one of the candidate cells or frequencies and not allowed cells from the first set and the candidate cells or frequencies and not allowed cells from the second set for reselection by the mobile device.

In another aspect, there is provided a tangible computer readable medium having computer readable instructions stored thereon that when executed control a mobile device to implement a method for obtaining candidate cells or frequencies of a second Radio Access Technology (RAT) while the mobile device is operating in a serving cell of a first RAT, the method comprising: obtaining at least one of a first set of candidate cells or frequencies and associated not allowed cells of the second RAT from a message transmitted for the serving cell; obtaining at least one of a second set of candidate cells or frequencies and associated not allowed cells of the second RAT from a message transmitted for a neighbour cell of the serving cell; and considering at least one of the candidate cells or frequencies and not allowed cells from the first set and the candidate cells or frequencies and not allowed cells from the second set for reselection by the mobile device.

In another aspect, there is provided a method for obtaining at least one of candidate cells or frequencies and associated not allowed cells of a second Radio Access Technology (RAT) while a mobile device is operating in a serving cell of the second RAT, the method comprising: obtaining at least one of a first set of candidate cells or frequencies and associated not allowed cells of the second RAT from a message transmitted for a neighbour cell in a first RAT; and considering at least one of the candidate cells or frequencies and not allowed cells from the first set and the candidate cells or frequencies and not allowed cells from the second set for reselection by the mobile device.

Other aspects and features of the present disclsoure will become apparent, to those ordinarily skilled in the art, upon review of the following description of the specific embodiments of the invention.

Referring now to FIG. 1A, a system 100 is shown comprising networks 180 and 190 of two RATs. In other embodiments of the system, there may be networks of any number of RATs. A first network 180 provides service for mobile devices operating using a first RAT and a second network 190 provides coverage for mobile devices operating using a second RAT. In the system 100, the coverage areas of the two networks 180 and 190 are overlapping. Each network 180 and 190 is comprised of a number of cells or frequencies (not shown in FIG. 1A). In some networks cells are grouped by frequency. For example, in E-UTRAN a center frequency comprises a plurality of cells. A neighbour cell repository 110 transmits messages for cells or frequencies of the first network 180 or the second network 190 or both. In 2G networks, for example, each cell has a designated frequency and the messages for each cell are transmitted on the respective frequency for the cell. In E-UTRAN, each center frequency is shared by more than one cell. Non-limiting examples of information in the messages can comprise available cells, available frequencies, not allowed cells, and priorities of cells or frequencies. Non-limiting examples of the messages transmitted include SI3, SI13 and SI2Q, which are described in detail in 3GPP TS 44.018 section 9.1.

Figure 1B:
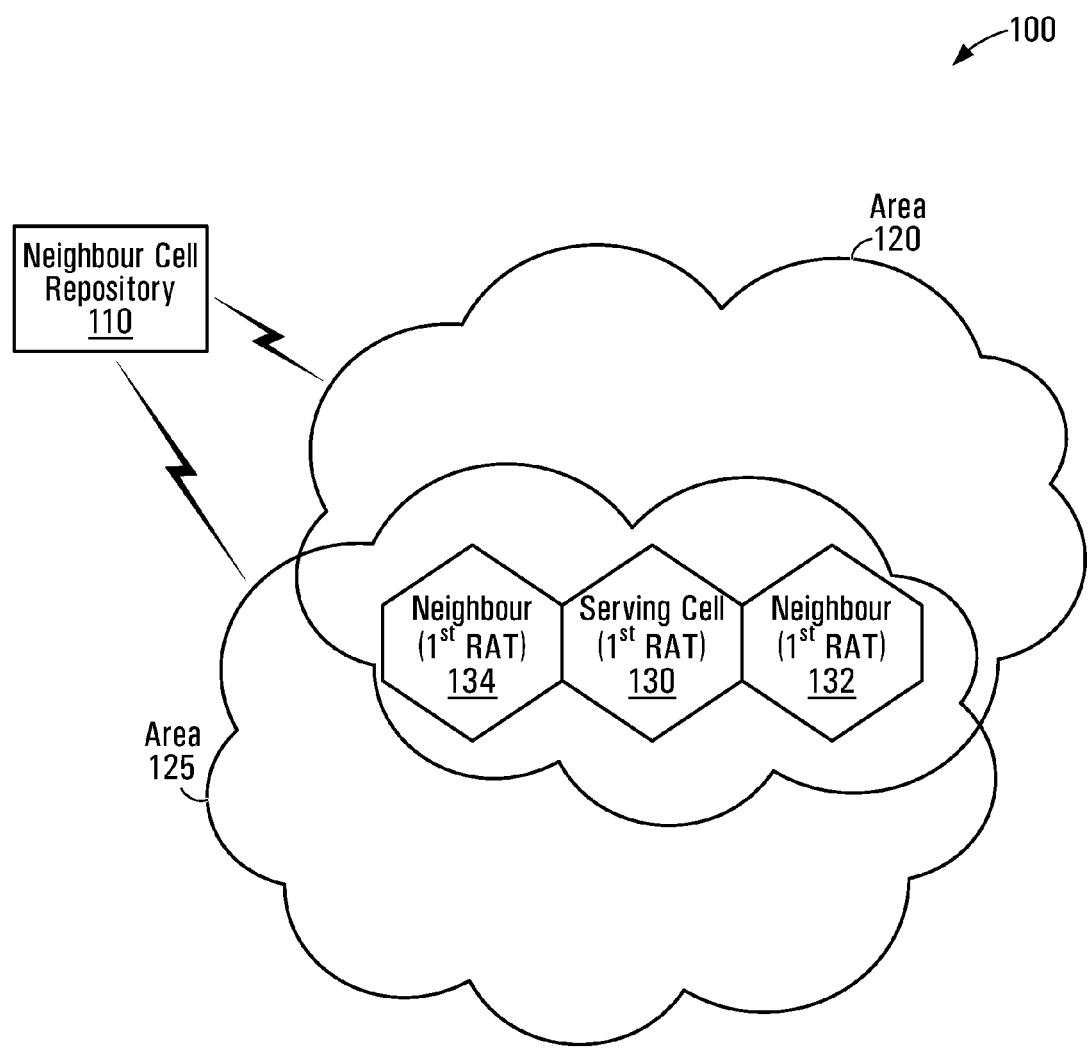

Referring now to FIG. 1B, an embodiment of the first network 180 or second network 190 comprises areas. For illustrative purposes only, two areas 120 and 130 are shown. In 2G, these areas may comprise Local Areas (LA) and Routing Areas (RA). In E-UTRAN, the network comprises tracking areas. In an embodiment of the system 100, there is a serving cell 130 of a first RAT, as well as two neighbour cells 132 and 134 of the first RAT within an area of overlapping LA and RA. The serving cell 130 is a cell where service is presently being provided to a mobile device. FIG. 1B shows two overlapping areas 120 and 130 for illustrative purposes only. In other embodiments, there can be any number of areas and they may or may not be overlapping.

Figure 1C:
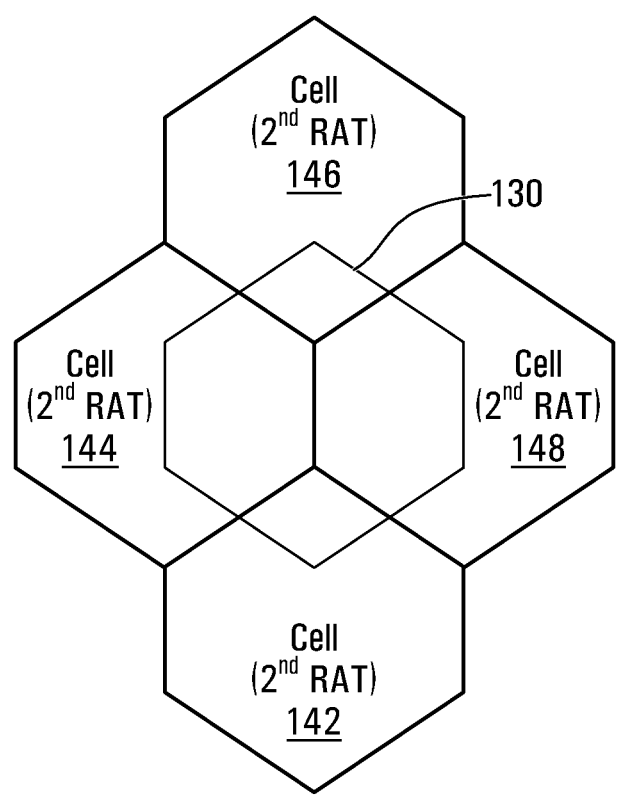

Referring to FIG. 1C, in an embodiment, there are four cells or frequencies of a second RAT 142, 144, 146 and 148 that overlap the serving cell 130. The particular arrangements shown in FIG. 1A, 1B or 1C are for illustrative purposes only. There can be any number of neighbour cells or frequencies and any number of cells or frequencies of the second RAT. Each cell does not necessarily abut or overlap another cell. Furthermore, there can be gaps and overlaps between any of the cells of the first RAT and any of the cells of the second RAT. In E-UTRAN cells are grouped by center frequency and may overlap or have gaps as well.

A network may have policies and priorities for the system 100 such that mobile devices select a cell of the specific RAT if it is available. In systems where the RATs are 2G and 3G, an example of such a policy is for the mobile device to select a 3G cell if one is available. Other examples of policies and priorities will be known to those of normal skill in the art.

In an embodiment, the neighbour cell repository 110 provides mobile devices in the serving cell 130 with a set of neighbour cells or frequencies of the first RAT. In addition the servicing cell may be provided a set of cells or frequencies on which to look for cells of the second RAT from which the mobile devices may select a cell for reselection. In the example shown in FIG. 1, the set of cells or frequencies of the second RAT should include all four cells or frequencies of the second RAT 142, 144, 146 and 148. However, in some situations the set of cells or frequencies of the second RAT provided for the serving cell 130 may be incomplete and may be missing one or more viable cells or frequencies of the second RAT 142, 144, 146 and 148. If a mobile device in the serving cell 130 attempts to measure each of the cells or frequencies provided in the set of cells or frequencies of the second RAT for the serving cell 130 and none of them are viable for reselection, the mobile device can obtain a further set of cells or frequencies of the second RAT, the further set being provided by the repository 110 for at least one of the neighbour cell(s) 132, 134. If the further set of cells or frequencies of the second RAT provided for the neighbour cell(s) 132, 134 includes cells or frequencies of the second RAT that were not the set of cells or frequencies of the second RAT for the serving cell 130, the mobile device can measure those additional cells or frequencies of the second RAT. In some embodiments, the mobile device can select a cell from those cells or frequencies measured.

In some embodiments, the mobile device selects one of the cells or frequencies measured that has at least one parameter that exceeds a threshold value. In some embodiments, the information provided for the serving cell and the neighbour cell includes a prioritized list of cells or frequencies. In some embodiments, the information provided for the serving cell and the neighbour cell includes a list of not allowed cells or frequencies. In addition, the mobile device can store information related to the cells or frequencies of the second RAT on an internal memory, separately or together with information related to the set of cells or frequencies of the second RAT provided for the serving cell 130.

Figure 2:
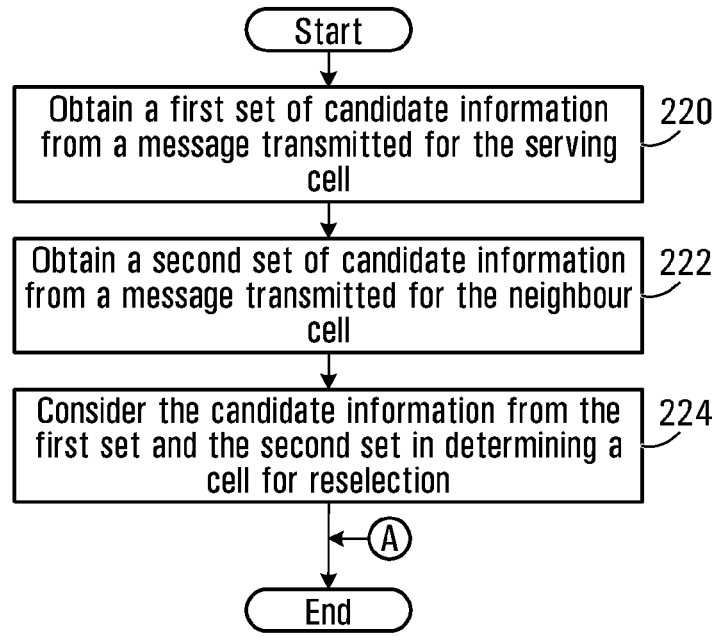
FIG. 2 is a flowchart of a method for obtaining a set of candidate information.

Referring now to FIG. 2, a method for obtaining candidate information while a mobile device is operating in a serving cell of a first RAT will be described. Non-limiting examples of candidate information are candidate cells and candidate frequencies. In some embodiments the candidate information is candidate cells or frequencies in a second RAT. In some embodiments the first RAT is 2G and the second RAT is 3G. In other embodiments, the RATs can be any one of 2G, 3G, E-UTRA, 4G or any other RAT. Non-limiting examples of 2G technologies are GSM (Global System for Mobile Communications), EDGE (Enhanced Data Rates for GSM) and CDMA IS-95 (Code Division Multiple Access IS-95). Non-limiting examples of 3G technologies are UMTS (Universal Mobile Telecommunication System) and CDMA 2000.

The method starts at step 220 which is obtaining a first set of candidate information from a message transmitted for the serving cell. Next, the method proceeds with obtaining a second set of candidate information from a message transmitted for a neighbour cell or neighbour frequency of the serving cell (Step 222). In some embodiments, for example if the first RAT is 2G, the message transmitted for the serving cell is transmitted at a frequency different from a frequency of the message transmitted for the neighbour cell. The final step is considering the candidate information from the first set and the candidate information from the second set in determining a cell for reselection by the mobile device (Step 224). The step of considering candidate cells or frequencies in determining a cell for reselection can include but is not limited to measuring the candidate cells or cells on the candidate frequencies and selecting a cell that ranks the highest based on measured values. Another example of considering candidate cells for reselection is attempting to reselect cells or frequencies from the first set and if unsuccessful, then attempting to reselect at least one cell or frequency from the second set.

In one embodiment, in a 2G/3G system or 2G/3G/E-UTRAN system or 2G/E-UTRAN system, the set of 3G cells or E-UTRAN frequencies provided for reselection by mobile devices in idle mode currently camped in 2G cells is obtained from an SI2Q message. Thus, in such a system, to implement the method of FIG. 2, the mobile device in the serving cell extracts a set of 3G cells and/or E-UTRAN frequencies for at least one 2G neighbour cell from at least one SI2Q message transmitted at a frequency designated for the at least one 2G neighbour cell.

In some embodiments the method includes determining at least one neighbour cell of the serving cell. In some embodiments the at least one neighbour cell is of the first RAT. In some embodiments where the first RAT is 2G, the neighbour cell is a 2G neighbour cell in the same LA/RA as the serving cell.

In a further embodiment, the candidate information comprises a set of not allowed cells or frequencies.

Figure 3:
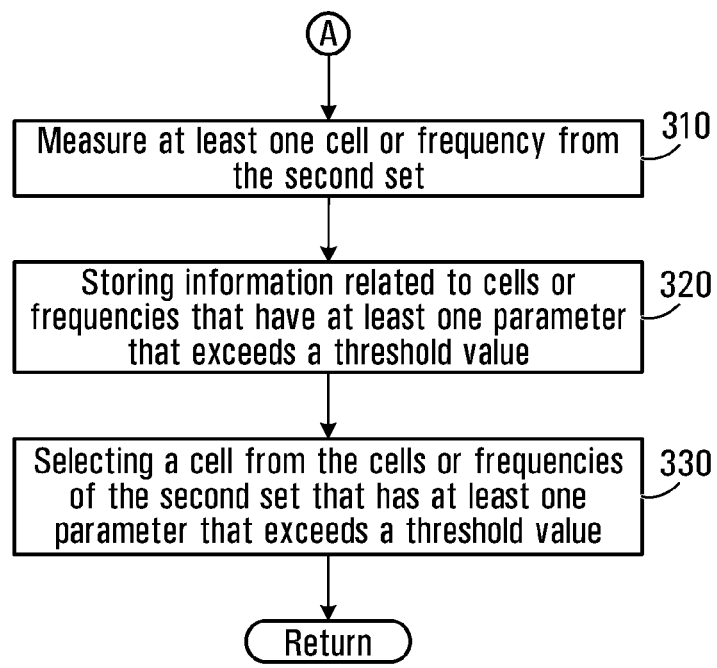
FIG. 3 is a flowchart of a further embodiment of the method depicted in FIG. 2.

Referring now to FIG. 3, some embodiments of the method further comprise measuring at least one cell or frequency from the second set of candidate information. This is shown as step 310 in the flowchart of FIG. 3, which starts at point A on the flowchart of FIG. 2, immediately after step 224. Measuring can comprise obtaining information related to quality of service in the respective cell or frequency. In 3G, measuring comprises measuring the Ec/No (Energy per chip over Noise) and RSCP (Received Signal Code Power) of the cell. Details of measuring are found in 3GPP TS 45.008 section 6.6.4.

In some embodiments, the method further comprises storing information related to any cells or frequencies in the second set of information that have at least one parameter that exceeds a threshold value on a memory in the mobile device. This is step 320 of FIG. 3. Non-limiting examples of information that can be stored for a cell in the set are: an identifier for the cell; a frequency for the cell; and values of measured parameters. In some mobile devices, the information related to candidate cells or frequencies in the second set is stored together with information related to candidate cells or frequencies from the first set. In some embodiments, the information stored is consolidated so that any duplicate information is not stored again. I.e. only information related to candidate cells or frequencies from the second set that is not already stored on the mobile device will be stored.

The method in some embodiments further comprises selecting a cell or frequency from the second set that has at least one parameter that exceeds a threshold value. This is step 330 of FIG. 3. This is advantageous if, for example, the selected cell or frequency did not appear in the first set of candidate cells or frequencies. The total number of cells or frequencies of the second RAT of which each mobile device is aware can thus be larger than the number provided for mobile devices in the serving cell.

In still further embodiments, the method further comprises ranking the candidate cells or frequencies of the second set. The ranking can be based on the values received from measurements, and may also include priority information received from a network with respect to the candidate cells or frequencies. The cells or frequencies in the second set can be ranked together with cells or frequencies of the first set. In this manner, in the E-UTRAN case, for example, the mobile device can select a cell or frequency on which to search for a cell based on the ranking. In some embodiments, the method comprises selecting a cell or frequency from the ranked cells or frequencies that is ranked highest. In some embodiments, information related to cells or frequencies that are ranked above a predefined value is stored in a memory on the mobile device. In this manner, the mobile device can keep information related to the top ranked cells or frequencies of the second RAT. For example, a mobile device can be configured to store information related to the top 3 or the top 10 cells or frequencies. Depending on the amount of memory available, the information for any number of cells can be stored.

Figure 4:
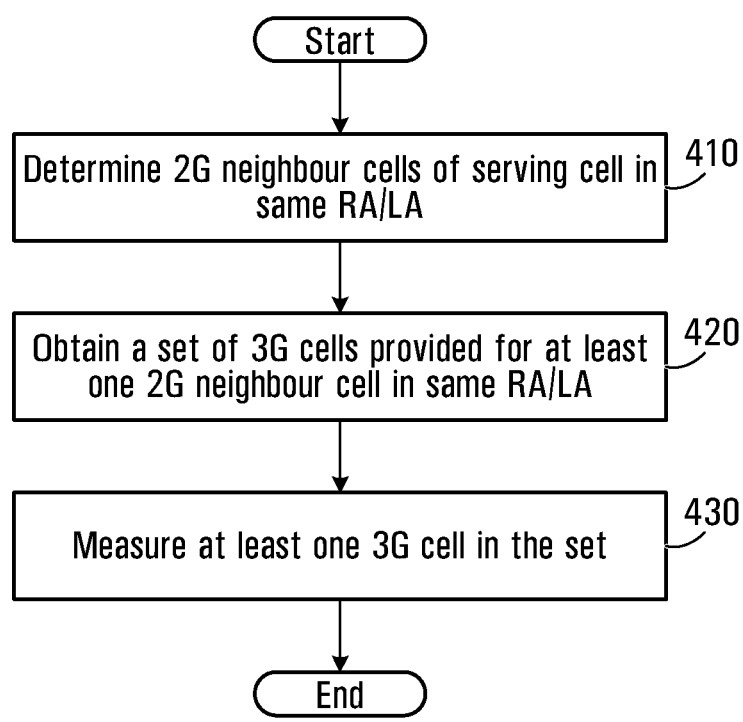
FIG. 4 is a flowchart of a method for obtaining a set of 3G cells.

As mentioned above, in some embodiments the method is implemented in a system having 2G and 3G networks, where there is a policy for subscriber mobile devices to select a 3G cell whenever possible. A method for obtaining a set of 3G cells will now be described with reference to FIG. 4. At step 410 a mobile device within a 2G serving cell determines at least one 2G neighbour cell that is in the same LA/RA as the serving cell. Then at step 420, the mobile device obtains a set of 3G cells provided for at least one of the 2G neighbour cells in the same LA/RA. At step 430, the mobile device measures at least one of the 3G cells in the set obtained. Embodiments of this method can also comprise ranking the 3G cells in the set obtained, either separately or consolidating the ranking with a further set of 3G cells provided for the serving 2G cell. In some embodiments this is done in a similar manner as described above with reference to FIGS. 2 and 3. Furthermore, information related to the 3G cells provided for the neighbour 2G cells can be stored on a memory on the mobile device. In some embodiments, this information is consolidated with information already stored on the mobile device related to 3G cells provided for mobile devices in the serving cell.

During normal operation in 2G, a mobile device will decode the System Information 3 (SI3), the System Information 13(SI13) and System Information 2 Quater (SI2Q) from the 2G neighbour cells that are being listed as neighbours for the 2G serving cell that the mobile device is currently camped on. SI3 contains a Location Area Identification (LAI) for the 2G cell, in accordance with 3GPP TS 44.018 section 9.1.43a, and SI13 contains a Routing Area Code (RAC) for the 2G cell, in accordance with 3GPP TS 44.018 section 9.1.35. In some embodiments the decoding is performed by a protocol stack (PS). The mobile device can assess from the neighbour 2G cell system information, which 2G cells are of the same Location Area (LA) and Routing Area (RA) as the presently serving 2G cell. The 2G cell information is obtained from SI2/SI2TER for idle mode, in accordance with 3GPP 44.018 sections 9.1.32 and 9.1.34, and from SI5/SI5TER for dedicated mode, in accordance with 3GPP 44.018 sections 9.1.37 and 9.1.39. No network interaction is required to reselect 2G cells of the same LA and RA. As the network has no way of knowing if the mobile device has autonomously reselected to one of these cells, the mobile device is free to extract the 3G neighbour cells listed for these 2G neighbours from the SI2Q for each neighbour cell, and make additional IRAT (Inter-Radio Access Technology) 3G measurements against them as candidates for reselection to 3G. This will increase the number of 3G candidates available to the mobile device and will address scenarios where a bad network configuration leaves viable 3G candidates off the list for the serving 2G cell, when they can be easily seen from the physical location and are seen to be listed in other 2G cells' neighbour lists. Any 3G cell from the lists of the 2G cells in the same LA and RA can be reselected by the mobile device without the mobile device first reselecting to one of the neighbour 2G cells.

During normal operation in 3G, a mobile device may decode System Information Block 1 (SIB 1), System Information Block 3(SIB 3) and/or System Information Block 4 (SIB 4), System Information Block 11 (SIB 11) and/or System Information Block 11bis (SIB 11bis) and/or System Information Block 11bis (SIB 12) from the 3G neighbour cells, that are being listed as neighbours for the 3G serving cell that the mobile device is currently camped on SIB 1 contains a Location Area Identification (LAI) for the 3G cell, in accordance with 3GPP TS 25.331 section 10.2.48.8.4, and also contains a Routing Area Code (RAC). The mobile device can assess from the neighbour 3G cell system information, which 3G cells are of the same Location Area (LA) and Routing Area (RA) as the presently serving 3G cell. The 3G cell information is obtained from SIB11 or SIB11bis for idle mode, in accordance with 3GPP 25.331 sections 8.1.1.6.11 and 8.1.1.6.11a, and from SIB11, SIB11bis or SIB12 for connected mode, in accordance with 3GPP 25.331 sections 8.1.1.6.11, 8.1.1.6.11a, 8.1.1.6.12. No network interaction is required to reselect 3G cells of the same LA and RA. As the network has no way of knowing if the mobile device has autonomously reselected to one of these cells, the mobile device is free to extract the neighbour cells listed for these neighbours from the SIB11, SIB11bis and SIB12 for each neighbour cell, and make additional measurements against them as candidates for reselection. This will increase the number of 3G candidates available to the mobile device and will address scenarios where a bad network configuration leaves viable 3G candidates off the list for the serving cell, when they can be easily seen from the physical location and are seen to be listed in other 3G cells' neighbour lists. Any 3G cell from the lists of the 3G cells in the same LA and RA can be reselected by the mobile device without the mobile device first reselecting to one of the neighbour 2G cells.

In addition after reselection from 2G to a 3G cell, the candidate cells from SI2Q of the 2G serving cell and additional 3G candidate cells from SI2Q of the neighbour 2G cells may be stored and utilised in 3G to increase the number of 3G candidates available but not listed as neighbours in System Information Block 11 (SIB 11) and/or System Information Block 11bis (SIB 11bis) and/or System Information Block 11bis (SIB 12). A protocol stack (PS) of a subscriber mobile device may decode the System Information Block 1 (SIB 1) of these additional candidates to determine the LA and RA of these additional cells. No network interaction is required to reselect 3G cells of the same LA and RA as the network has no way of knowing if the mobile device has autonomously reselected to one of these cells. This will increase the number of 3G candidates available to the mobile device and will address scenarios where a bad network configuration leaves viable 3G candidates off the list for the serving cell, when they can be easily seen from the physical location and instead of a reselection to another RAT.

In an exemplary embodiment, the following implementation may be used:

1) A mobile device will obtain and keep information on 3G cells from SI2Q of a predetermined number (for example 2 or 3) of strongest 2G neighbour cells from the same LA/RA as a camped cell, in addition to SI2Q of the serving cell;

2) If the 3G cells listed in SI2Q_serving (i.e. the SI2Q provided for the serving cell) as measured in a predetermined number (for example two, three, four, or five) of consecutive measurement attempts do not fulfill reselection criteria, the device will perform detected cell measurements on the frequencies listed in SI2Q_serving, whereby the mobile device will list all 3G cells that it can resolve on the listed frequencies;

3) If detected cell measurements do not discover viable 3G cells or if the detected cell measurements find cells that are not listed in the SI2Q_serving or the SI2Q_neighbours (i.e. the SI2Q for the two strongest neighbours), the mobile device will ignore the results and fall back to the regular 3G measurements procedure (step 1) until step 2 is triggered once again;

4) If detected cell measurements find a 3G cell that is suitable for reselection and this cell is listed in SI2Q_neighbours, the mobile device will consider it for 2G to 3G reselection and start a predetermined (for example 4 or 5 seconds) guard time. The regular cell reselection rules for the service provider will apply; and 5) If the serving 2G cell or 2G neighbour cells are changed, the 3G cells that are monitored will be changed accordingly.

Of course, the above method only describes one possible implementation. The 3G cells can be obtained from the SI2Q of any number of 2G neighbour cells and any number of measurement attempts can be made. Likewise, the guard time can be any length that is appropriate to ensure that the mobile device does not jump to a cell that was only available momentarily or for a short period of time. In some embodiments, no guard time is used.

The methods described herein are implemented on a mobile device. The methods, in some embodiments, may be implemented using hardware, firmware, computer-readable media having computer-readable instructions stored thereon or combinations thereof.

Figure 5:
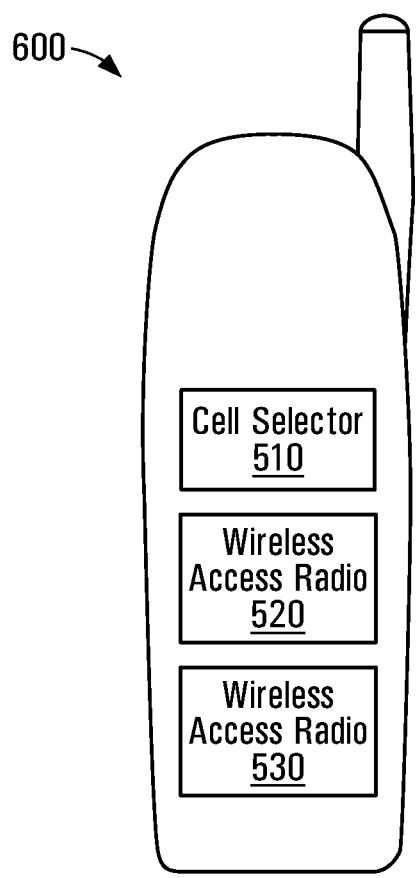
FIG. 5 is a diagram of a mobile device on which the methods described herein may be executed.

One embodiment of a mobile device will now be described with reference to FIG. 5. A mobile device 500 is configured to operate using more than one RAT. The mobile device 500 comprises a cell selector 510 and a wireless access radio 520 and 530 for each RAT. For illustrative purposes, the device 500 shown in FIG. 5 has two wireless access radios 520 and 530. However, embodiments of mobile devices described herein can have any number of wireless access radios.

The cell selector 510 is configured to, when the mobile device 500 is operating in a serving cell of a first RAT, obtain, through at least one of the wireless access radios 520 and 530, a first set of candidate information from a message transmitted for the serving cell. The cell selector 510 also obtains, through at least one of the wireless access radios 520 and 530, a second set of candidate information from a message transmitted for a neighbour cell of the serving cell. The cell selector 510 is also configured to consider the candidate information from the first set and the candidate information from the second set in determining a cell for reselection by the mobile device 500.

The mobile device 500, in some embodiments, also comprises a tangible computer readable medium having computer readable instructions stored thereon for implementing the cell selector 510. In other embodiments the mobile device 500 further comprises a protocol stack. The cell selector may be located on the protocol stack. The protocol stack can also be used to decode SI13 and SI2Q messages.

In some embodiments the mobile device 500 also includes a memory for storing the first set of candidate information and the second set of candidate information.

Figure 6:
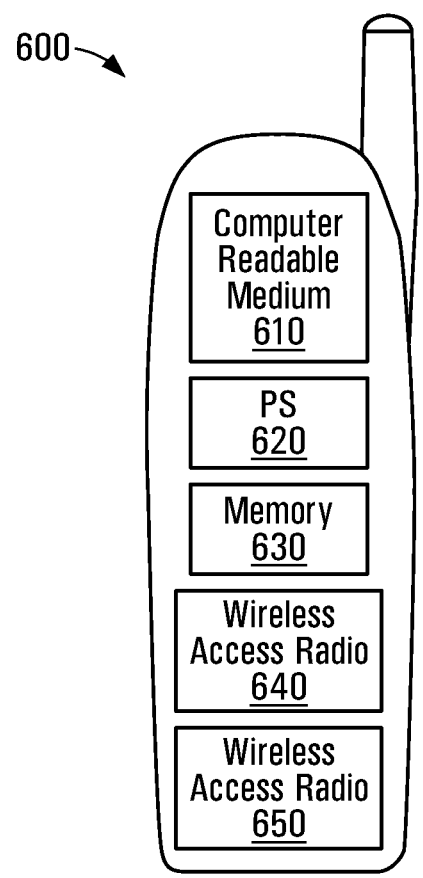
FIG. 6 is a diagram of a mobile device on which the methods described herein may be executed.

A mobile device 600 comprising a computer readable medium 610, a protocol stack 620, a memory 630 and two wireless access radios 640 and 650 is shown in FIG. 6. The computer readable medium 610 stores computer-readable instructions for implementing any of the methods described herein. The protocol stack 620 can store the computer readable medium 610 or perform decoding functions for the mobile device or both. The memory 630 can store information or data obtained in performing the methods implemented by the computer-readable instructions. The wireless access radios 640 and 650 perform a similar function as wireless access radios 520 and 530 described with reference to FIG. 5.

Figure 7:
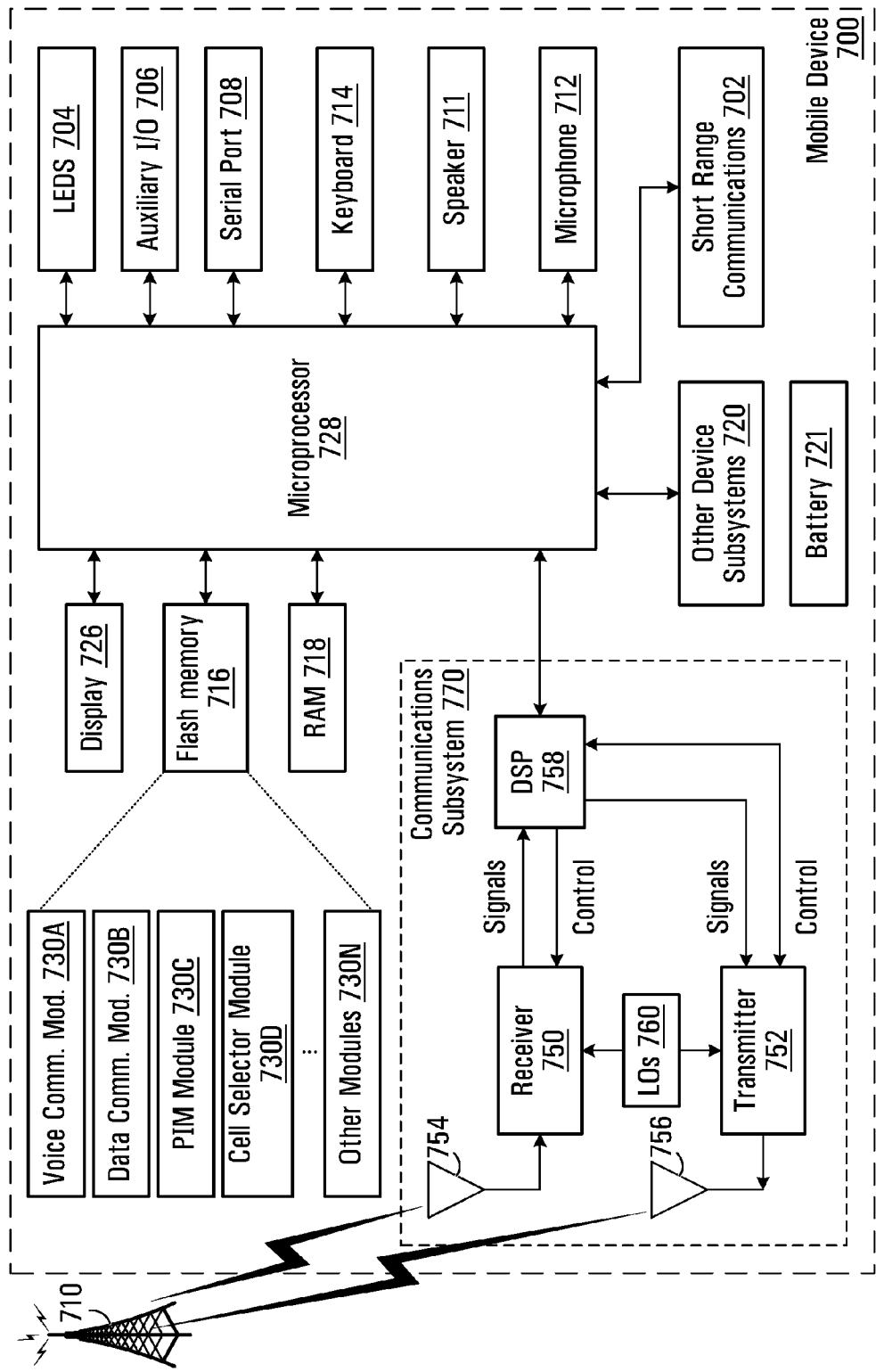
FIG. 7 is a block diagram of a mobile device on which the methods described herein may be executed.

Referring now to FIG. 7, shown is a block diagram of a mobile device 700 that may implement any of the methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system.

In addition, a software application to perform a cell selector function 730D may be installed. The cell selector function 730D may implement any of the methods described herein for obtaining a set listing cells or frequencies of a second Radio Access Technology (RAT) while the mobile device is operating in a serving cell of a first RAT.

As well, additional software modules, illustrated as another software module 730N, may be installed during manufacture.

What has been described is merely illustrative of the application of the principles of methods, modules and devices described herein. Other arrangements and methods can be implemented by those skilled in the art without departing from the spirit and scope of the embodiments.

We claim:

1. A mobile device configured to operate using more than one Radio Access Technology 'RAT', the mobile device comprising:
   for each radio access technology, a respective wireless access radio;
   a cell selector configured to, while the mobile device is operating in a serving cell of a first RAT:
   obtain, through at least one of the wireless access radios, a first message comprising at least one of:
   i) a first set of candidate information concerning cells or frequencies that are provided as candidates for cell reselection from the serving cell; and
   ii) frequencies that may be associated with a first set of not allowed cells of a second RAT;
   obtain, through at least one of the wireless access radios, a second message comprising at least one of:
   i) a second set of candidate information concerning cells or frequencies that are provided as candidates for cell reselection from a neighbour cell of the serving cell; and
   ii) frequencies that may be associated with a second set of not allowed cells of the second RAT;
   determine a cell for reselection with consideration of at least one of:
   i) the candidate information from the first set and the candidate information from the second set; and
   ii) the frequencies and associated not allowed cells from the first set and the frequencies and associated not allowed cells from the second set.

2. The mobile device of claim 1, wherein the cell selector is configured to:
   receive the first message from the serving cell; and
   receive the second message from the neighbour cell of the serving cell.

3. The mobile device of claim 1, wherein the candidate information comprises candidate cells or candidate frequencies of at least one of the first RAT and a second RAT.

4. The mobile device of claim 1, wherein the cell selector is further configured to obtain, through at least one of the wireless access radios, information indicating not allowed cells associated with frequencies obtained from at least one message comprising candidate information provided for at least one of the first RAT and a second RAT.

5. The mobile device of claim 1, wherein the first RAT is 2G and the candidate information is for a second RAT comprising at least one of 3G and E-UTRA.

6. The mobile device of claim 1, further comprising a computer readable medium having computer readable instructions stored thereon for implementing the cell selector.

7. The mobile device of claim 1, further comprising a memory for storing the first set of candidate information and the second set of candidate information.

8. A method for a mobile device to obtain candidate information while the mobile device is operating in a serving cell of a first Radio Access Technology 'RAT', the method comprising:

obtaining a first message comprising at least one of:
 i) a first set of candidate information concerning cells or frequencies that are provided as candidates for cell reselection from the serving cell; and
 ii) frequencies that may be associated with a first set of not allowed cells of a second RAT;
obtaining a second message comprising at least one of:
 i) a second set of candidate information concerning cells or frequencies that are provided as candidates for cell reselection from the neighbour cell of the serving cell; and
 ii) frequencies that may be associated with a second set of not allowed cells of the second RAT;
determine a cell for reselection with consideration of at least one of:
 i) the candidate information from the first set and the candidate information from the second set; and
 ii) the frequencies and associated not allowed cells from the first set and the frequencies and associated not allowed cells from the second set.

9. The method of claim 8, comprising:
receiving the first message from the serving cell; and
receiving the second message from the neighbour cell of the serving cell.

10. The method of claim 8, wherein the candidate information comprises candidate cells or candidate frequencies of at least one of the first RAT and a second RAT.

11. The method of claim 8, further comprising measuring at least one cell or frequency from the second set.

12. The method of claim 8, further comprising storing a subset listing any candidate cells or frequencies from the second set that have a parameter that exceeds a threshold value on a memory in the mobile device.

13. The method of claim 12, further comprising selecting a candidate cell or frequency from the subset.

14. The method of claim 8, further comprising ranking the candidate cells or frequencies in the second set.

15. The method of claim 8, wherein the serving cell is a 2G cell, the neighbour cell or frequency comprises a predetermined number of strongest 2G neighbour cells, and the candidate information is for 3G, the method further comprising:
making a predetermined number of attempts to measure 3G cells listed in the first set and if a viable 3G cell is not located, performing detected cell measurements on frequencies in which 3G neighbour cells are known from the first set to be present;
if the detected cell measurements find a viable 3G cell that is listed in the second set, considering the viable 3G cell detected for reselection.

16. The method of claim 8, wherein the neighbour cell is in the same location area and routing area as the serving cell.

17. A non-transitory computer readable medium having computer readable instructions stored thereon that when executed by a processor of a mobile device implement a method for the mobile device to obtain candidate information while the mobile device is operating in a serving cell of a first Radio Access Technology 'RAT', the method comprising:
obtaining a first message comprising at least one of:
 i) a first set of candidate information concerning cells or frequencies that are provided as candidates for cell reselection from the serving cell; and
 ii) frequencies that may be associated with a first set of not allowed cells of a second RAT;
obtaining a second message comprising at least one of:
 i) a second set of candidate information concerning cells or frequencies that are provided as candidates for cell reselection from the neighbour cell of the serving cell; and
 ii) frequencies that may be associated with a second set of not allowed cells of the second RAT;
determine a cell for reselection with consideration of at least one of:
 i) the candidate information from the first set and the candidate information from the second set; and
 ii) the frequencies and associated not allowed cells from the first set and the frequencies and associated not allowed cells from the second set.

* * * * *